United States Patent
Schiefele et al.

(10) Patent No.: US 12,184,778 B2
(45) Date of Patent: Dec. 31, 2024

(54) SYSTEM AND METHOD FOR CHANGING ENCRYPTION KEYS

(71) Applicant: HID Global Corp., Austin, TX (US)

(72) Inventors: Markus Johannes Schiefele, Huntly, VA (US); Daniel Henri Raguin, Jupiter, FL (US); George William McClurg, Jensen Beach, FL (US)

(73) Assignee: HID Global Corp., Austin, TX (US)

(*) Notice: Subject to any disclaimer, the term of this patent is extended or adjusted under 35 U.S.C. 154(b) by 232 days.

(21) Appl. No.: 18/148,858

(22) Filed: Dec. 30, 2022

(65) Prior Publication Data
US 2024/0223366 A1  Jul. 4, 2024

(51) Int. Cl.
| | |
|---|---|
| H04L 29/06 | (2006.01) |
| H04L 9/08 | (2006.01) |
| H04L 9/16 | (2006.01) |
| H04L 9/32 | (2006.01) |

(52) U.S. Cl.
CPC .............. *H04L 9/16* (2013.01); *H04L 9/0866* (2013.01); *H04L 9/3231* (2013.01)

(58) Field of Classification Search
CPC ......... H04L 9/0866; H04L 9/16; H04L 63/20; H04L 63/10; H04L 9/3231; H04L 9/0861
USPC ........................................................ 713/186
See application file for complete search history.

(56) References Cited

U.S. PATENT DOCUMENTS

| | | | |
|---|---|---|---|
| 10,979,426 B2 * | 4/2021 | Wagner .................. | H04L 9/3231 |
| 11,546,164 B2 * | 1/2023 | Badrinarayanan .... | H04L 9/3231 |
| 2010/0138667 A1 * | 6/2010 | Adams .................... | G06F 21/83 |
| | | | 713/186 |
| 2024/0223366 A1 * | 7/2024 | Schiefele .............. | H04L 9/0866 |

OTHER PUBLICATIONS

Ratha, Nalini K, et al., "Generating Cancelable Fingerprint Templates", IEEE Transactions on Pattern Analysis and Machine Intelligence, 29(4), (Apr. 2007), 561-572.

* cited by examiner

*Primary Examiner* — Longbit Chai
(74) *Attorney, Agent, or Firm* — Schwegman Lundberg & Woessner, P.A.

(57) ABSTRACT

Methods and systems are provided for changing an encryption key for biometric templates in a database without changing the content within the database. A first biometric template is encrypted with a first encryption key to create a first encrypted first biometric template. A transformation is applied to the first encrypted first biometric template to create a second encrypted first biometric template. A second encryption key is generated based on the first encryption key and the transformation permitting the use of the second encryption key to compare presented biometrics encrypted with the second encryption key with templates stored in the database.

17 Claims, 7 Drawing Sheets

SYSTEM AND METHOD FOR CHANGING ENCRYPTION KEYS

BACKGROUND

In order to grant access to a controlled space, biometric identification systems can be employed. Current biometric identification systems can capture a biometric presentation that can be used to create a biometric template. For security purposes, the biometric template can be encrypted with an encryption key to create a first encrypted biometric template. When a user attempts to access the controlled space, the user can provide a biometric, which can, by itself or in conjunction with another form or forms of identification, such as a password or the presentation of a physical credential, be used to either grant access or deny access to the controlled space. After the user provides the biometric at the time of trying to access the controlled space, the template derived from the provided biometric can be encrypted with the encryption key, thereby creating a second encrypted biometric template. If a match score for the first and second encrypted biometric templates meets a predetermined condition which is considered to be a match, the user may be granted access to the controlled space. Otherwise, the user may be denied access. The first and second encrypted biometric templates can generally only match if they are encrypted with the same encryption key. By only using encrypted biometric templates and a matching algorithm that works on encrypted biometric templates, personally identifiable information (PII) does not need to be stored, thereby protecting the identity of the individuals utilizing the security system even in the event of a cybersecurity attack and minimizing biometric storage, handling and liability costs.

Storing PII may have to be done in a legally compliant manner. To illustrate, if an entity stores PII, the entity may have to ensure that the entity complies with any relevant laws governing its storage or use, e.g., Illinois's Biometric Information Privacy Act (BIPA) or the European General Data Protection Regulation (GDPR). Laws such as BIPA and GDPR relate to the storage of PII. In particular, BIPA can relate to the collection, use, and handling of PII where a violation of regulations associated with the collection, use, or handling of PII could expose the entity to legal consequences. Similarly, among other requirements, GDPR stipulates that PII should not be stored for longer than is necessary and that PII should be processed in a manner that ensures security, integrity, and confidentiality. Accordingly, it is beneficial to store biometric information in an encrypted form.

Encrypting the biometric templates with an encryption key has the added benefit that, if the biometric templates are compromised, the security attack can be remediated by changing the encryption key and generating a new set of encrypted templates to serve as the gallery database with which to match future biometric presentations. For systems that utilize an encryption that must be performed on the original unencrypted biometric template, the replacement of the compromised encrypted biometric template with new secure data will require that new biometrics are captured thereby generating the replacement encrypted biometric template, an arduous task given that it requires human subjects to be contacted and new biometric presentations acquired from them. In some scenarios, the unencrypted biometric template can be stored and a replacement template can be generated from the unencrypted biometric. However, storing the unencrypted biometric is disfavored for, e.g., the legal and technical reasons described above. The present invention solves this problem and teaches how a database of biometric templates encrypted with a first key may be encrypted with a second key without requiring a new biometric presentation data and preserving the ability to perform biometric matches with the second key encoded database for the purposes of identifying all parties who are authorized to access the controlled space. Accordingly, the invention permits realizing the benefits of storing the biometric information in an encrypted form while avoiding the logistical issues of obtaining new biometric presentations when the encryption keys are changed.

DETAILED DESCRIPTION

A first biometric template can be encrypted with a first encryption key. When a user desires access to a controlled space, the user can provide a biometric which can be used to create a second biometric template that can be encrypted with the first encryption key. If the first encrypted biometric template is compromised or a decision is made to change encryption, such as if the encryption is changed at a regular interval, and then the gallery database (all encrypted biometric templates, part or just the compromised ones) comprising one or more biometric templates encrypted with the first encryption key are then re-encrypted using a transformation without decrypting the templates. The process of using the transformation on a template encrypted with a first encryption key renders all compromised templates encrypted with the first encryption key worthless. If the matching algorithm and the encrypted template are not in a form capable of being matched after the aforementioned first key and a transformation are applied, then if PII has not been stored, the first encrypted biometric templates would have to be recreated, which would involve all parties who are authorized to access the controlled space and whose biometrics were compromised to provide their biometric again.

The present invention solves this problem by enabling the changing of an encryption key used to encrypt encrypted biometric templates without having access to the biometric templates that were originally encrypted. Thus, all parties who are authorized to access the controlled space do not need to provide an additional biometric. Initially, a biometric template, containing meta data representing key features of biometric data obtained with a biometric sensor, can be created for a user and encrypted with a first encryption key to create a first encrypted biometric template. The first encrypted biometric template can be stored locally or remotely at a database. Furthermore, the first encrypted biometric template can be used to verify an encrypted biometric template generated when a user is attempting to gain access to the controlled area.

At a later time, the first encrypted biometric template may be compromised, thereby requiring additional encryption of the first encrypted biometric template. A transformation can be applied to the first encrypted biometric template where the concatenation of the first encryption and the transformation can create a second encrypted biometric template. The second encrypted biometric template can be stored locally or remotely at the database and used to verify an encrypted biometric template from a user attempting to gain access to the controlled area. A second encryption key can be created that is equivalent to applying said first encryption to data and then performing the said transformation. This second encryption key can then be used to encrypt any new biometric templates that are to be added to the new encrypted gallery database. In particular, when the second encryption algorithm is applied to a biometric template created during a subsequent capture of a biometric of a user, the resulting encrypted biometric template corresponds to the second encrypted biometric template created and locally or remotely stored where said second encrypted biometric template was created with the concatenation of the first encryption and the transformation. Thus, encryption using the second encryption key would produce the same results as encryption with a different first encryption key followed by the transformation.

When a user attempts to gain access to the controlled space after the second encrypted biometric template has been created, biometrics associated with the user can be captured and used to create a biometric template, which can be encrypted with the second encryption key. The biometric template encrypted with the second encryption key can be compared with the second encrypted biometric template. If a match occurs, the user may be granted access to the controlled space. If a match does not occur, the user may be denied access to the controlled space.

An example of generating a second encryption that can be applied to an unencrypted biometric template to produce an encrypted template that is the same as an encrypted template encrypted with a first encryption key and a transformation is as follows. Artificial neural networks (ANN) can be used for image processing to create features for biometric templates. The ANN can be a convolutional neural network (CNN), which is a form of ANN, and can extract a feature vector, also known as a biometric template, from a biometric image such as an image or video of a face or a portion of a face. ANN can include a type of machine learning tailored for image processing along with tasks that involve processing pixel data. ANN can uncover information in both time series and image data. ANN can create biometric features that can be used for creating biometric templates described herein.

A matching algorithm can calculate the Euclidian distance between two feature vectors associated with the biometric image where a smaller Euclidian distance can indicate a better match. By way of example, one encryption method applicable to the present invention since it maintains the ability to perform matching is to encrypt the feature vectors by scrambling their dimensional order.

Figure 1:
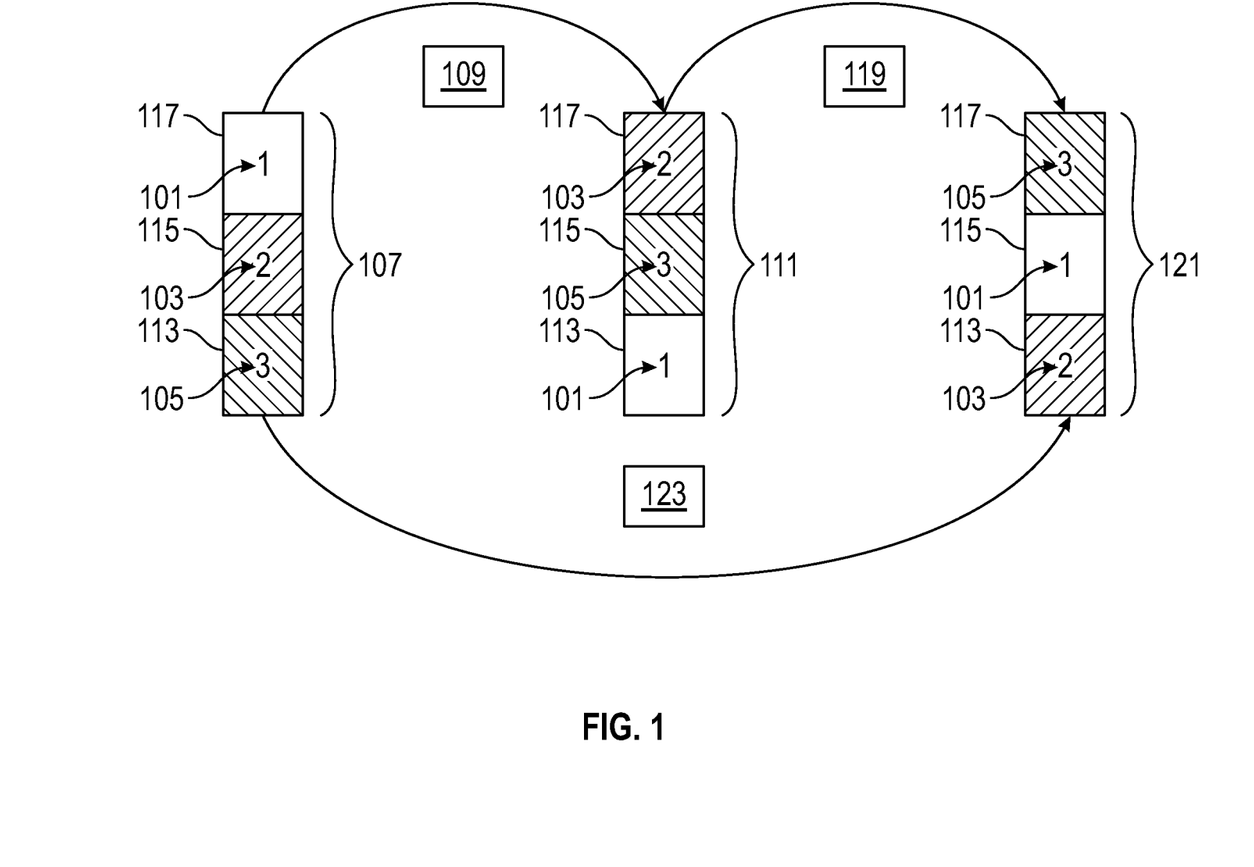
FIG. 1 is an example of encrypting data with different encryption keys and a transformation, according to some examples of the present disclosure.

To further illustrate, biometric template 107 in FIG. 1 has three features illustrated by respective differently-shaded boxes 117, 115, and 113, that were extracted by an ANN, for example by a CNN. FIG. 1 is provided for illustrative purposes to generally explain the principles of encryption in terms of using a first encryption key, a transformation, and a second encryption. Examples herein are not limited to the discussion with reference to FIG. 1. One skilled in the art will realize that a three-feature vector, or a three-dimensional vector, is too simplistic for practical use. The low-dimensional number was chosen solely for ease of illustration. In practice an N-dimensional feature vector is preferred such that the N! possible encryptions (or dimensional scrambles) are sufficiently large that the probability of a cyber-attack succeeding in any reasonable time in guessing the correct dimensional encryption ordering is sufficiently low. By way of example, N=128 may be used, which creates approximately $4 \cdot 10^{215}$ encryption combinations. In FIG. 1, it is shown how the second encryption key 123 relates to the combination of the first encryption key 109 and a transformation 119 with regards to the encryption of a biometric template. A CNN can create features 101, 103, and 105 in a biometric template 107 having an order 1, 2, 3. Here, a first encryption key 109 can be applied to the biometric template 107 to create an encrypted biometric template 111 having the order 2, 3, 1. The key 109 can specify that the feature 101 will move to a position 113, the feature 105 will move to a position 115, and the feature 103 will move to a position 117. Calculating the Euclidian distance between two feature vectors $\vec{x}$ and $\vec{y}$ is invariant to the dimensional order of $\vec{x}$ and $\vec{y}$ as long as $\vec{x}$ and $\vec{y}$ have the same order:

$$\sqrt{(x_1 - y_1)^2 + (x_2 - y_2)^2 + (x_3 - y_3)^2} = \sqrt{(x_2 - y_2)^2 + (x_3 - y_3)^2 + (x_1 - y_1)^2} \qquad (1)$$

The transformation 119 can be applied such that application of the transformation 119 to the encrypted biometric template 111 will move the feature 101 to the position 115, move the feature 103 to the position 113, and move the feature 105 to the position 117 to create an encrypted biometric template 121. A second encryption key 123 can be created that, when applied to the biometric template 107, moves the feature 101 from the position 117 to the position 115 and moves the feature 103 from the position 115 to the position 113. Moreover, application of the second encryption key 123 to the set 107 moves the feature 105 from the position 113 to the position 117 such that the application of the second encryption key 123 to the biometric template 107 creates the encrypted biometric template 121. Thus, application of the second encryption key 123 to an unencrypted biometric template, such as the biometric template 107, can produce the encrypted template 121 as if the first encryption key 109 and the transformation 119 were applied to the biometric template 107.

Figure 2:
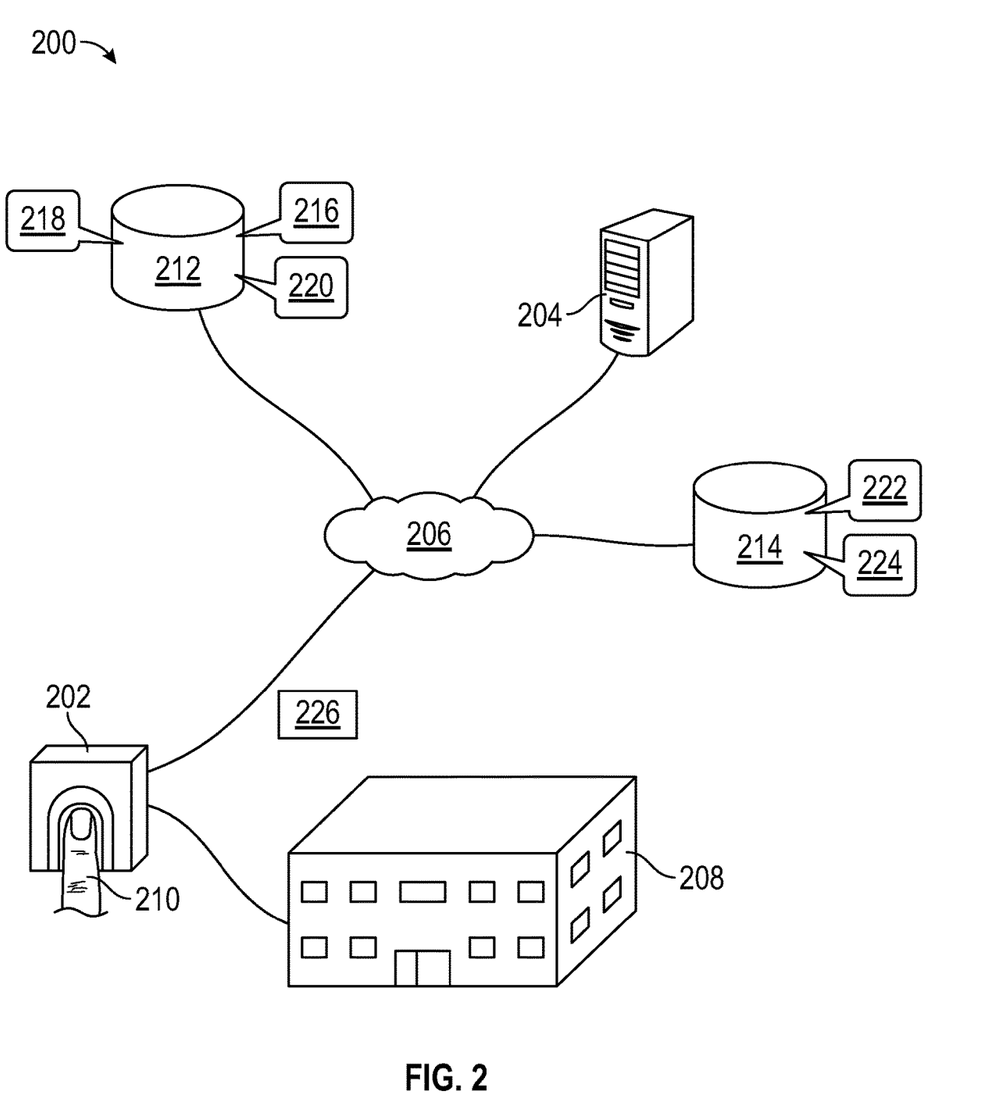
FIG. 2 illustrates an exemplary environment within which examples described herein can operate, according to some examples of the present disclosure.

FIG. 2 illustrates an exemplary environment within which examples described herein can operate. The environment 200 can include a biometric sensor 202 communicatively coupled with a server device 204 via a network 206. The biometric sensor 202 can provide functionality that can facilitate access to a controlled space 208. Here, the biometric sensor 202 is shown as a biometric fingerprint scanner that can scan and capture the ridges and valleys of a finger 210. The biometric sensor 202 can discern minutiae corresponding to specific feature points on a fingerprint. These points may include fingerprint characteristics such as ridge bifurcation or a ridge ending of a fingerprint. The biometric sensor can perform a live capture to collect biometrics, which can be digitally processed to create a biometric template. The biometric template can be a collection of the extracted features, such as ridge bifurcations or ridge endings. While generally discussed in terms of an image, it will be understood that the biometric data may include one or more of, e.g., images of a body part such as face, finger, palm, or portion of a body part, video showing a person's gait or writing, DNA, signature, measured bodily-function signals, such as electrocardiogram or electroencephalogram data, etc. The types of sensor(s) in biometric sensor 202 may vary depending on the biometric data being presented. For example, where the biometric sensor 202 is a fingerprint scanner, the biometric sensor 202 may include one or more of optical sensors, capacitive sensors, thermal line sensors, or the like, to discern minutiae corresponding to a fingerprint. While the biometric sensor 202 is illustrated in FIG. 2 as a biometric fingerprint scanner, the biometric sensor 202 can include any type of biometric device such as a facial recognition terminal to recognize a face of a user, palm vein scanners, iris scanners, retina scanners, a palm scanner, a body scanner, a hand geometry scanner, or hybrid biometric devices that combine any of these modalities.

The server device 204 can be any type of computing device, such as a desktop computer, a laptop computer, rack-mounted computer, virtual machine, or a tablet computer. In some embodiments, server device 204 may comprise multiple computers connected through a network, such as network 206. The network 206 may be any network that enables communication between or among machines, databases, and devices (e.g., the biometric sensor 202, the server device 204, and databases 212 and 214). Accordingly, the network 206 can be a wired network, a wireless network (e.g., a mobile or cellular network), or any suitable combination thereof. The network 206 can include one or more portions that constitute a private network, a public network (e.g., the Internet), or any suitable combination thereof. In some embodiments, the system may be contained within a single device having server 204, databases 212 and 214, and sensor 202. In such an embodiment, network 206 may comprise internal communications or connections within the device.

While the controlled space 208 is shown as a physical space comprising a building, the controlled space 208 can include any type of physical or virtual space, asset, or resource that has restricted access, such as a room, a machine or computational resource, a document, a private wide area network, a private local area network, a personal account, or the like. In some embodiments, controlled space 208 may include multiple such spaces. The databases 212 and 214 can be data storage resources and may store data structured as or in text file(s), binary file(s), table(s), spreadsheet(s), a relational database, an object-orientated database, an object-relational database, a triple store, a hierarchical data store, or any suitable combination(s) thereof.

As noted above, the examples discussed herein relate to changing encryption key(s) used to encrypt encrypted biometric templates without requiring access to the biometric templates themselves. Now making reference to FIG. 3, a method 300 for changing an encryption key used to encrypt encrypted biometric templates without having to recreate the biometric templates that are to be encrypted is shown.

Figure 3:
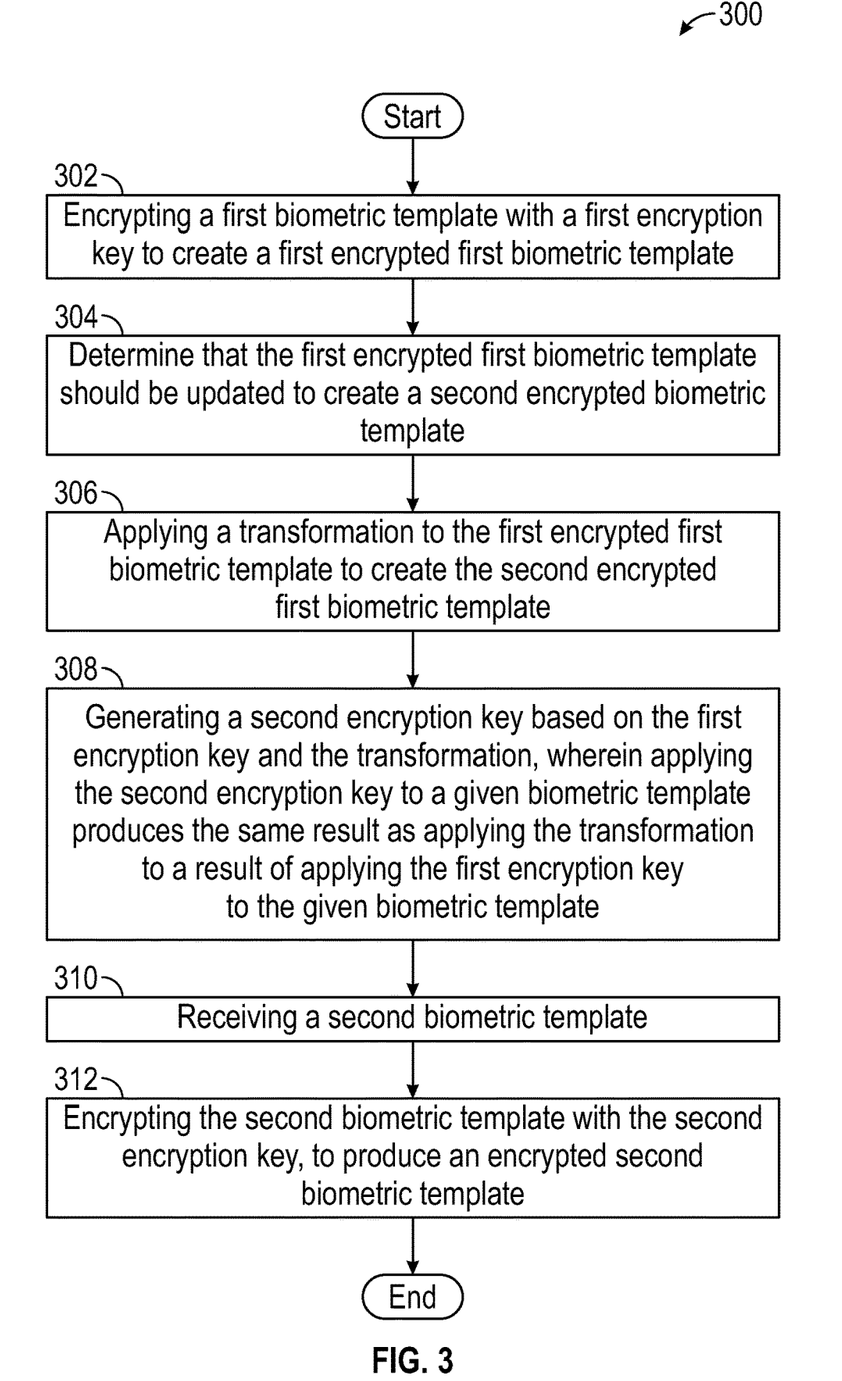
FIG. 3 illustrates a method for changing an encryption key used to encrypt encrypted biometric templates without having to recreate the biometric templates that are to be encrypted, according to some examples of the present disclosure.

Initially, during an operation 302, a first biometric template can be encrypted with a first encryption key to create a first encrypted first biometric template.

In the following description of FIG. 3, for ease of discussion, reference will be made to an example where biometrics relate to fingerprint scanning. However, other modalities of biometrics are also envisioned to ascertain unique biometric patterns. For example, facial recognition can be used where landmark points, such as one or more of a distance between the eyes of a user, a distance between a tip of a nose of a user to the left nostril and a distance between a tip of a nose of a user to the right nostril along with the a distance between the corners of the mouth of a user can be used to generate data to build a biometric template, in the case of handcrafted templates. Other landmark data that may be added to a handcrafted biometric template include the depth of eye sockets, a distance between the forehead and chin of a user, cheekbone shape, and/or contours of lips, ears, and chin. The locations of the landmark points may be extracted from one or more of two-dimensional or three-dimensional images. The data processed from the located landmark points, e.g, the calculated IPD or interpupillary distance, may be used as is or coded (e.g., converted to an 8- or 16-bit integer) and used as feature values for the biometric N-dimensional feature vector. This handcrafted feature vector may be referred to as the biometric template. Conversely, an ANN or specifically a CNN may be constructed to extract features from facial images or other biometric images where said machine learning network is built and tuned based upon match score accuracy feedback of genuine and imposter matches and the features output by the network comprise the biometric template.

As a further example, iris scanners can be used to capture unique patterns in the iris of a user. In some examples, the iris scanners can employ near infrared light (NIR) to capture unique patterns of the iris of a user. A digital code can be extracted from the unique biometric patterns and used to generate biometric templates.

Regardless of the type of biometric information being used to grant or deny access to the controlled space 208, during an enrollment process, a user provides biometrics using a biometric sensor. During the enrollment process, the biometrics can be captured, digitized, encrypted, and stored as a first biometric template in a database 212 or 214.

During the operation 302, the first biometric template can be encrypted at the server device 204 with a first encryption key 216 to create a first encrypted first biometric template 218. The first encrypted first biometric template 218 can be stored at the database 212. A biometric template can be a metadata file derived from the biometric presentation data that can include features useful for biometric identification, where the features may be extracted from the biometric presentation using one or more of hand-crafted algorithms and machine-learning code. In a preferred embodiment, the biometric sensor 202 captures the biometric presentation data of a user, generates a template and then encrypts the template using a non-reversable sensor encryption key. This key may be a public key or may be a key that is programmed specifically for that particular sensor such that the genuine installed sensor cannot be easily replaced with a compromised biometric sensor. The encrypted template 226 may be sent over network 206 and to database 212 where it is further encrypted with database encryption key 216. Separate cryptography can be used for data in transit, such as the biometric templates, scanned data, captured data, encrypted biometric templates, and the like, that is being transmitted between the biometric sensor 202, the server device 204, the databases 212 and 214, and the controlled space 208. For example, any suitable in-transit encryption method(s), such as Hypertext Transfer Protocol Secure (HTTPS), Transport Layer Security (TLS), Internet Protocol Security (IPsec), or the like may be used to encrypt the data during transit. The first database encryption key or simply first encryption key 216 can be a randomly generated sequence of bits. If the key represents the order that an N-dimensional biometric feature vector is to be rearranged in, then if N can be represented in M bytes, N×M bytes may be the length of the encryption key. For the previously cited example of a 128-dimensional feature vector, a 128-byte length encryption key may be used. The first encryption key 216 can be a symmetric key where a single key can be used to encrypt and decrypt data, such as the first encrypted first biometric template 218. A symmetric key, however, runs the risk of compromising the entire database and runs the risk of a cyberattack being able to extract PII from the database even if the biometric is encrypted. Accordingly, it is preferable that the first encryption key 216 can be asymmetric or can be used with a public key/private key method. Referring again to the example where the biometric information presenting is a fingerprint, the first biometric template can include geometrical properties of the minutiae associated with the fingerprint where the first encryption key 216 can have a sequence of geometrical transformations including one of rotations, translations, and mirroring.

The first encrypted first biometric template 218 can be used to grant a user access to the controlled space 208. Again, referring to the fingerprint example, when the user desires to access the controlled space 208, a second biometric template can be created when the finger 210 of a user is applied to the biometric sensor 202. When the second biometric template is created, the second biometric template can be encrypted with the first encryption key 216 to create an encrypted second biometric template. The encrypted second biometric template can be compared with the first encrypted first biometric template 218. If a match occurs between first encrypted first biometric template 218 and the encrypted second biometric template (i.e., the match score of the two encrypted templates meets a programmed condition), the user can be granted access to the controlled space 208.

After the operation 302, the method 300 can perform an operation 304. During the operation 304, a determination can be made that the first encrypted first biometric template 218 should be updated to create a second encrypted first biometric template. The determination may be made, for example, if the first encrypted first biometric template 218 may have been compromised when a breach or suspected breach at the database 212 has occurred, such as if the database 212 has been hacked and the first encrypted first biometric template 218 has been procured. For another example, the determination can be made if a period of time has elapsed since the first encrypted first biometric template was created, such as if the encryption is changed at regular intervals as part of routine security maintenance. While hacking and routine maintenance are given as two scenarios relating to why the first encrypted first biometric template 218 should be updated to a second encrypted first biometric template, examples are not limited to these scenarios and updating can occur for any number of reasons. In particular, this disclosure can relate to scenarios where an administrator or user may want to change encryption for a database for any reason.

Periodically creating a second encrypted first biometric template can be useful in examples where a database stores many biometric templates, such as hundreds, thousands, or millions of biometric templates. The present invention is not limited to the number of biometric templates that have their encryption updated. The entire database may change from a first encryption to a second encryption protocol, or only one or more subsets of the templates, including subsets comprising only a single biometric template, might change. Regardless of the number of templates to be updated, the selected biometric templates can be updated in accordance with method 300 where a transformation and the resulting second encryption keys are created and applied to the selected database subset(s). The remainder of the database that was not selected, if any, may retain its first encryption protocol, or alternatively method 300 may be reapplied one or more times to one or more subsets of the remaining database not initially selected. As part of these additional applications of method 300, additional unique transformations may be selected to arrive at new encryption protocols, such as a third or fourth encryption each with their own encryption key. In this manner, if instead of an encrypted biometric template being compromised, an encryption key is compromised, the entire database does not need to be re-encrypted, but rather only that subset of the database that utilized the compromised encryption key.

Continuing with the description of method 300, in response to operation 304 determining that the first encrypted first biometric template 218 has been compromised or requires new encryption as part of a security protocol, method 300 can perform an operation 306. During the operation 306, the server device 204 can apply a transformation 220 to the first encrypted first biometric template 218 to create a second encrypted first biometric template 222. In fingerprint examples, the first biometric template can include geometrical properties of minutiae that can include x, y coordinates along with direction, such as a direction $\Theta$. The transformation 220 can shuffle the minutiae in order to encrypt the geometrical properties, such as the x, y coordinates and the direction $\Theta$.

After the transformation is applied to the first encrypted first biometric template 218 to create the second encrypted first biometric template 222, the method 300 can perform an operation 308. During the operation 308, the server device 204 can generate a second encryption key 224 based on the first encryption key 216 and the transformation 220. Similar to the first encryption key 216, the second encryption key 224 can be a randomly generated sequence of bits. Also, the second encryption key 224 can be a symmetric key where a single key can be used to encrypt and decrypt data. The symmetric key may be advantageous in order to minimize the time associated with a later encryption process, such as when a user is attempting to access a controlled space. Furthermore, the second encryption key 224 can be asymmetric or can be used with a public key/private key method.

When an unencrypted biometric template is encrypted with the second encryption key 224, encryption using the second encryption key 224 can produce an encrypted template that is the same as an encrypted template encrypted with the first encryption key 216 and the transformation 220. Thus, encryption of an unencrypted template using the second encryption key 224 would have the same results as encryption of the unencrypted template using the first encryption key 216 and the transformation 220. Thus, when a first biometric template is encrypted with the first encryption key 216 and then with the transformation 220, the resulting second encrypted first biometric template 222 can be the same as the first biometric template encrypted only using the second encryption key 224.

The transformation 220 can be determined based on a desired encryption according to Equation 2:

$$E_2 = E_1 \ddot{A} \, T \tag{2}$$

In the above equation, $E_1$ corresponds to an encryption that is output with the first encryption key 216 and $E_2$ corresponds to an encryption that is output with the second encryption key 224. $\ddot{A}$ can correspond to a concatenation operator while T can correspond to the transformation 220. In this example, $E_1$ and $E_2$ can be known, i.e., the first encryption E; output with the first encryption key 216 is known and the second encryption $E_2$ output with the second encryption key 224 is already known such that the second encryption key 224 is already known. With $E_1$ and $E_2$ known, using the $\ddot{A}$, the transformation 220 can be determined such that the transformation 220 can be a function of the first encryption key 216 and the second encryption key 224.

After the second encryption key 224 is generated in the operation 308, the method 300 can perform an operation 310. During the operation 310, the server device 204 can receive a second biometric template 226. In particular, a user may desire to access the controlled space 208. Thus, the user can apply their finger 210 against the biometric sensor 202, where the user's biometrics can be digitized and used to create the second biometric template 226, which can be sent to the server device 204. While, in the example, the second biometric template 226 is shown as being sent to the server device 204 via the network 206, the biometric sensor 202 can be proximate to the server device such that the second biometric template 226 can be sent directly to the server device 204 without going through the network 206. Furthermore, in some examples, the databases 212 and 214 can be local to the server device 204, such as at the server device 204. Here, the second biometric template 226 can be stored directly on the databases 212 and 214 without having to traverse the network 206.

In an operation 312, the server device 204 can encrypt the second biometric template 226 with the second encryption key 224 to produce an encrypted second template. Here, the resulting encrypted second biometric template 226 is equivalent to or produces the same results as a concatenation of (1) an encryption of the second biometric template 226 with the first encryption key 216 and (2) the transformation 220. Thus, encryption of the second biometric template 226 with the first encryption key 216 and the transformation 220 results in an encrypted second biometric template that is the same as if the second biometric template was encrypted with only the second encryption key 224.

Therefore, if one or both of the databases 212 and 214 are compromised and encrypted first biometric templates are improperly procured, instead of having to regenerate first biometric templates, the encryption associated with the first biometric templates can be changed, thereby rendering the procured first biometric templates useless. More specifically, instead of having to discard encrypted biometric templates that were encrypted with the first encryption key 216, if one or both of the databases 212 and 214 are compromised, which could result in having to conduct the above-described enrollment process again, the transformation 220 can be applied to the encrypted biometric templates to create second encrypted biometric templates. Thus, if a user attempts to use the improperly procured first biometric templates that were only encrypted with the first encryption key 216 to gain access to the controlled space 208, access will be denied since the encrypted templates stored at the databases 212 and 214 for comparison purposes have been encrypted with the transformation 220 after the databases 212 and 214 have been compromised. Moreover, one of the databases 212 and 214 can be considered local to the server device 204 while the other of the databases 212 and 214 can be considered remote to the server device 204.

The encrypted second biometric template can be compared with the second encrypted first biometric template created during the operation 306. If a match occurs between the second encrypted first biometric template and the encrypted second biometric template, the user who provided the biometric during the operation 310 may be granted access to the controlled space 208. Upon completion of the operation 312, the method 300 is complete. The process to obtain access to the controlled space 208 may, from the user's perspective, appear or be identical to the process performed by the user prior to the start of method 300, such that the user is unaware that the encryption for the relevant biometric template was changed.

In some examples, different encryptions can be used for different groups. Now making reference to FIG. 4, a database 400 is shown having groups 402A-402N. Each of the groups 402A-402N can have associated PII 404A-404N along with encrypted biometric templates 406A-406N. The PII 404A-404N can be any type of personal identification information, such as personal identification number, a password, or the like. Moreover, the PII can be received via a keypad, a fob, a mobile device, a card, or the like. Here, multifactor authorization can be used where, in addition to providing biometric information, a user desiring to gain access to the controlled space 208 also provides a personal identification number. Moreover, in examples, PII can be used to identify an encryption key that is associated with a particular encrypted biometric template. In particular, different encryption keys can be used to encrypt different ones of the biometric templates 406A-406N. PII can be used to identify which encryption keys were used to encrypt the biometric templates 406A-406N such that the proper encryption key can be selected to encrypt the biometric template created when a user attempts to access the controlled space 208. The biometric templates 406A-406N can be created during an enrollment process as described above.

Figure 4:
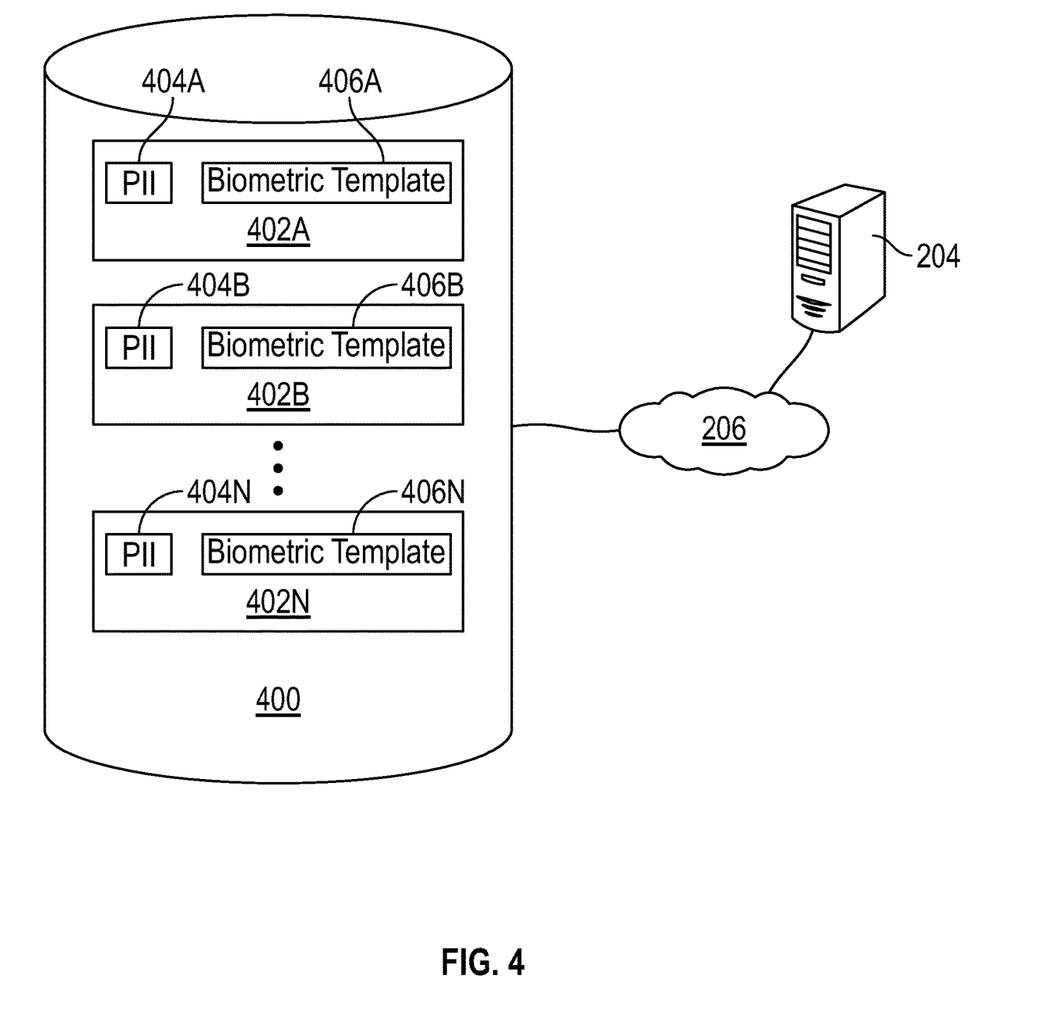
FIG. 4 shows an environment where a database includes encrypted biometric templates that implement different encryptions with different encryption keys, according to some examples of the present disclosure.

In some instances, it may become necessary to change the encryption for all biometric templates in a database. For example, situations can arise where if all biometric templates stored in a database are encrypted with the same encryption key, if one of the encrypted biometric templates is compromised, then all the biometric templates encrypted with the encryption key for the encrypted biometric template that was compromised must be re-encrypted. As shown in FIG. 4, the encrypted biometric templates 406A-406N can be encrypted with different encryption keys, where the encryption keys can be functionally and structurally similar to the first encryption key 216. If the database 400 is partially compromised, since the biometric templates 406A-406N have been encrypted with different first encryption keys, different second encryption keys could only be created for those of the biometric templates 406A-406N that have been compromised. This can be desirable to minimize resources necessary to generate second encryption keys, i.e., devoting resources to generating second encryption keys for those templates that have been comprised while avoiding creating second encryption keys for templates that have not been compromised. Thus, if the biometric template 406A and the biometric templates 406B and 406N were encrypted with different encryption keys, only the biometric template 406A needs to be re-encrypted. If the encrypted biometric template 406B is compromised, the server device 204 can apply a transformation, similar to the transformation 220, to the encrypted biometric template 406B to create a second encrypted biometric template, as discussed above. Moreover, if all of the biometric templates 406A-406N were compromised, then second encryption keys could be created for the all of the second encrypted biometric templates 406A-406N.

A second encryption key can be created, as discussed above with reference to the operation 308. When the biometric template 406B is encrypted with the second encryption key, encryption of the unencrypted biometric template with the second encryption key can produce an encrypted template that is the same as an encrypted template encrypted with the first encryption key and the transformation. Thus, encryption with the second encryption key would have the same results as encryption with the first encryption key and the transformation. Thus, when a second biometric template is created when a user attempts to access the controlled space 208, as discussed above with reference to the operation 310, the second template can be encrypted with the second encryption key where the encrypted second template can match a biometric template that was encrypted with the first encryption key and the transformation.

If the entire database 400 has been compromised such that in addition to the encrypted biometric template 406B, the encrypted biometric templates 406A and 406N have also been compromised, the procedure described above, i.e., encryption with a transformation and creating a second encryption key, can be performed for each of the encrypted biometric templates 406A and 406N since each of the encrypted biometric templates 406A and 406N have different encryption keys associated therewith. In some instances, not all of the biometric templates 406A-406N may be compromised. As such, the operations of applying a transformation and creating a second encryption key does not need to be performed.

In some scenarios, the database 212 could have a first number of templates, such as five first encrypted templates, that are encrypted with a first encryption key. The database 214 could have a second number of templates, such as six first encrypted templates, that are encrypted with a second encryption key different from the first encryption key. A first transformation could be used with the five first encrypted templates (i.e., those in database 212) to create five second encrypted templates. A second transformation different from the first transformation could be used with the six first encrypted templates (i.e., those in database 214) to create six second encrypted templates that are encrypted using the same key, a third encryption key, as the five second encrypted templates. Additional templates could be encrypted with the third encryption to create encrypted templates that are the same as the five second encrypted templates and the six second encrypted templates. This scenario could be pertinent in the case of centralization of multiple separate biometric security systems into a single system, such as combining security systems for multiple buildings or combining security systems for access to certain physical controlled spaces 208 and virtual controlled spaces 208, such as computer access.

In further examples, if a subset of encrypted templates encrypted with a first encryption key is compromised, then a transformation can be created and used to encrypt only the subset of the encrypted templates that have been compromised. Moreover, a second encryption key could only be created for the subset of the encrypted templates. Thus, a transformation may not need to be created and used for those encrypted templates that were not compromised. In addition, a second encryption key may not need to be created for those encrypted templates that were not compromised.

Figure 5:
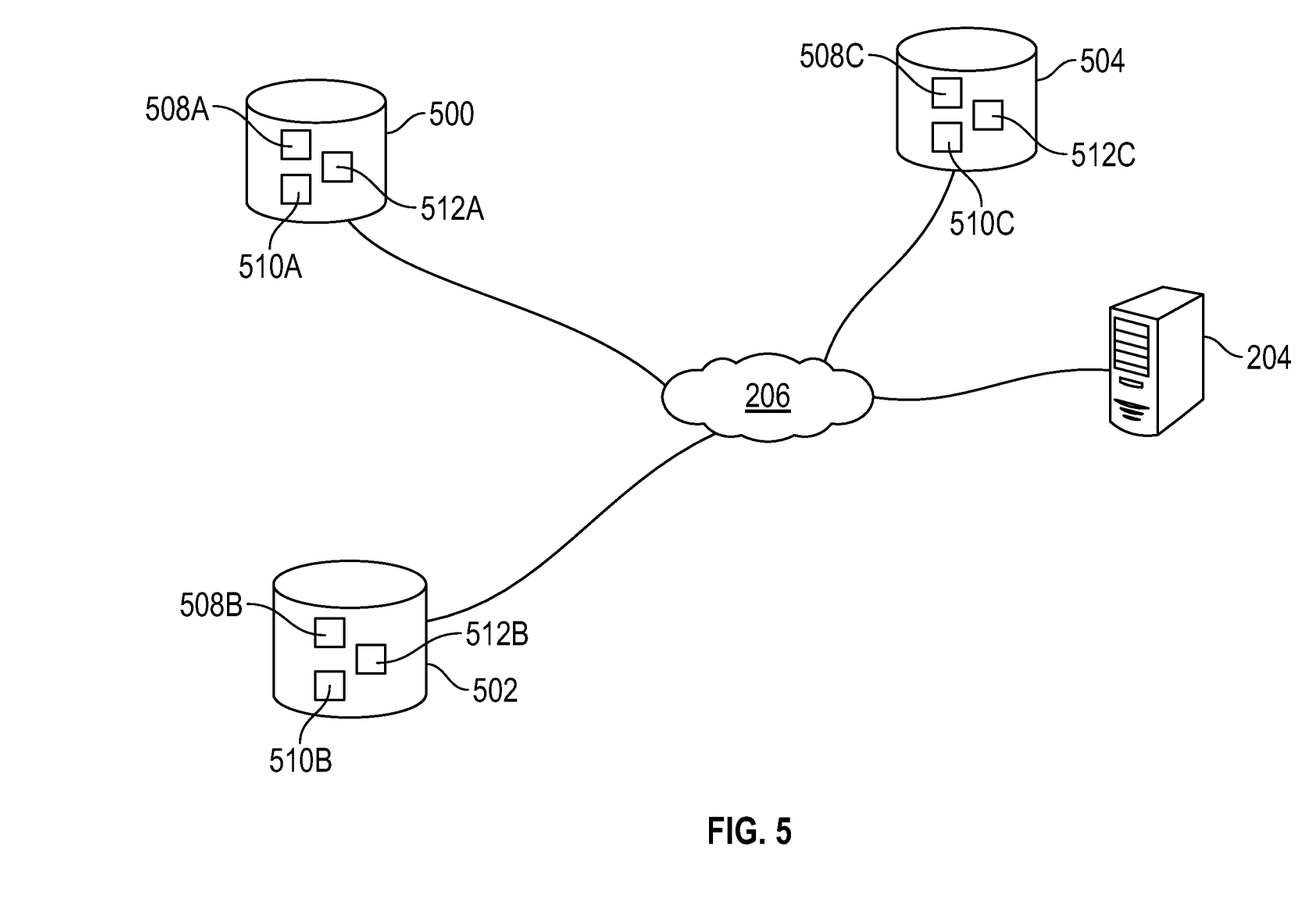
FIG. 5 illustrates a distributed storage environment where portions of encrypted biometric templates are distributed across different database, according to some examples of the present disclosure.

Now, making reference to FIG. 5, encrypted templates can be distributed over different databases 500-504. In particular, the database 500 can store partial encrypted templates 508A-512A, the database 502 can store partial encrypted templates 508B-512B, and the database 504 can store partial encrypted templates 508C-512C. It should be noted that while only three databases are shown, any number of databases are envisioned where partial encrypted templates can be distributed across the databases. Moreover, in some examples, not all portions of the partial encrypted templates can be distributed across all of the databases. While the databases 500-504 are described as storing the partial encrypted templates 508A-512A, 508B-512B, and 508C-512C, instead of databases, server devices having functionality similar to the server device 204 can store the partial encrypted templates 508A-512A, 508B-512B, and 508C-512C.

Here, the partial encrypted templates 508A-512A, 508B-512B, and 508C-512C can form complete encrypted templates. More specifically, the partial encrypted templates 508A-C can form an encrypted template, the partial encrypted templates 510A-C can form an encrypted template, and the partial encrypted templates 512A-C can form an encrypted template. Thus, the partial encrypted templates 508A-508C can form a complete encrypted template similar to the first encrypted first biometric template 218. Similarly, the partial encrypted templates 510A-510C and 512A-512C can form complete encrypted templates similar to the first encrypted first biometric template 218. In this example, the encrypted templates are separately stored as partial encrypted templates in order to create a higher level of security. More specifically, if only one or two of the databases 500-504 (or, more generally, less than all of the distributed databases) are compromised, the compromised partial encrypted templates are not enough to gain access to a limited access space, such as the controlled space 208.

When a user attempts to access the controlled space 208, a second biometric template can be created as detailed above with reference to the operation 310. However, since the encrypted templates are stored as the partial encrypted templates 508A-512A, 508B-512B, and 508C-512C, when the second biometric template is created, the second biometric template can be divided into portions that correspond to each of the partial encrypted templates 508A-512A, 508B-512B, and 508C-512C. Thus, the second biometric template can be portioned into three separate portions and the three separate portions can be encrypted. The three separate encrypted portions can be separately compared with the corresponding partial encrypted templates 508A-512A, 508B-512B, and 508C-512C. Upon a match, the user can be granted access to the controlled space 208.

If one of the databases 500-504 is compromised, then only second encryption keys associated with the partial encrypted templates 508A-512A, 508B-512B, and 508C-512C stored in the compromised databases should be generated. To further illustrate, if the database 502 is compromised such that the partial encrypted templates 508B-512B are compromised, the operations 306 and 308 described above can be performed for only the partial encrypted templates 508B-512B to create second partial encrypted templates 508B-

512B. More specifically, second encryption keys can be generated based on the first encryption and the transformation applied to the partial encrypted templates 508B-512B to create the second partial encrypted templates 508B-512B. Furthermore, since the partial encrypted templates 508A-512A and 508C-512C were not comprised, the operations 306 and 308 do not need to be performed for the partial encrypted templates 508A-512A and 508C-512C. Instead, the operations 306 and 308 would only be performed for partial encrypted templates that have been compromised, such as the partial encrypted template 510B.

Thus, when a user attempts to gain access to the controlled space 208 where a second biometric template is received and portioned as detailed above, the portion of the second biometric template that corresponds to one of the partial encrypted templates 508B-512B that was compromised is encrypted with the second encryption key. For explanatory purposes, the partial encrypted template 510B was compromised. Thus, the portion of the second biometric template that corresponds to the partial encrypted template 510B is encrypted with the second encryption key. In this example, the partial encrypted templates 510A and 510C were not comprised and remain encrypted with the first encryption key. As such, the portions of the second biometric template that correspond to the partial encrypted templates 510A and 510C are encrypted with the first encryption key. After all of the portions of the second biometric template are encrypted with either a first encryption key (partial encrypted templates 510A and 510C) or with the second encryption key (partial encrypted template 510B), each of the respective encrypted portions of the second biometric template are compared with corresponding partial encrypted templates 510A-510C. If a match occurs, the user can be granted access to the controlled space 208.

In the above example, only one database, the database 502, is described as being compromised. However, more than one database can be compromised, such as two of the databases 500-504 or all of the databases 500-504 can be compromised. Here, the operations described with reference to FIG. 3 can be performed on those partial encrypted templates 508A-512A, 508B-512B, and 508C-512C that have been compromised in any number of the databases 500-504 that have been compromised. Moreover, the partial encrypted templates 508A-512A, 508B-512B, and 508C-512C can have the characteristics of the encrypted templates 406A-406N where each of the partial encrypted templates 508A-512A, 508B-512B, and 508C-512C are encrypted with different encryption keys.

In the description above, the biometric sensor is described as being remote from the server device 204. In some embodiments, the biometric sensor device 202 could be at the server device 204, e.g., hardwired to the server device 204. Thus, scanning and/or capturing could take place directly at the server device 204. In further examples, the biometric sensor 202 can include all of the functionality described herein, or some of the functionality described herein. In examples where the biometric sensor 202 includes some of the functionality described herein, the biometric sensor 202 could encrypt a captured biometric with an encryption key, such as one of the first encryption key 216 or the second encryption key 224 as the case may be, prior to sending to the server device 204 for matching, etc.

Figure 6:
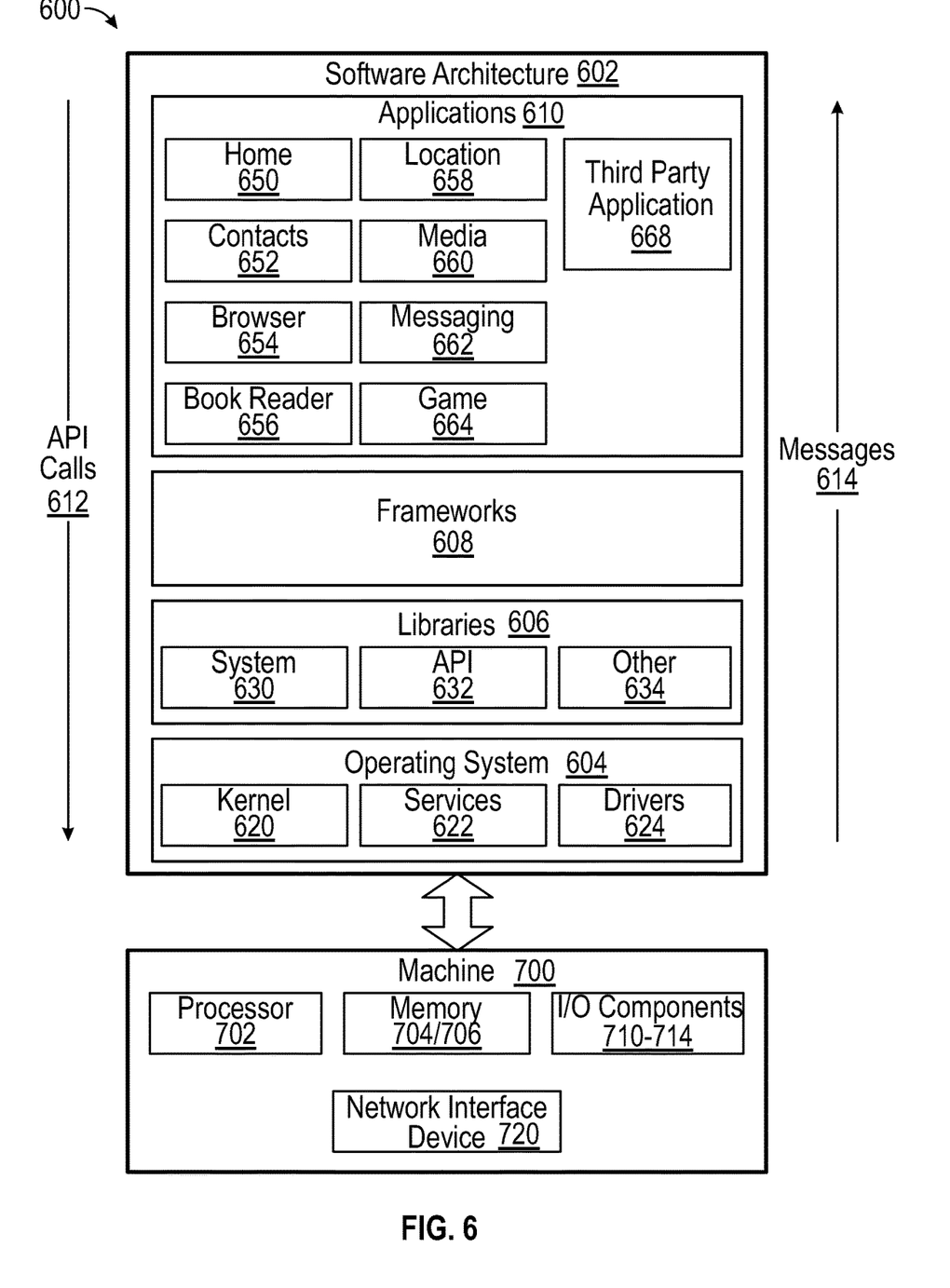
FIG. 6 is a block diagram illustrating an example of a machine upon which one or more examples may be implemented.
Figure 7:
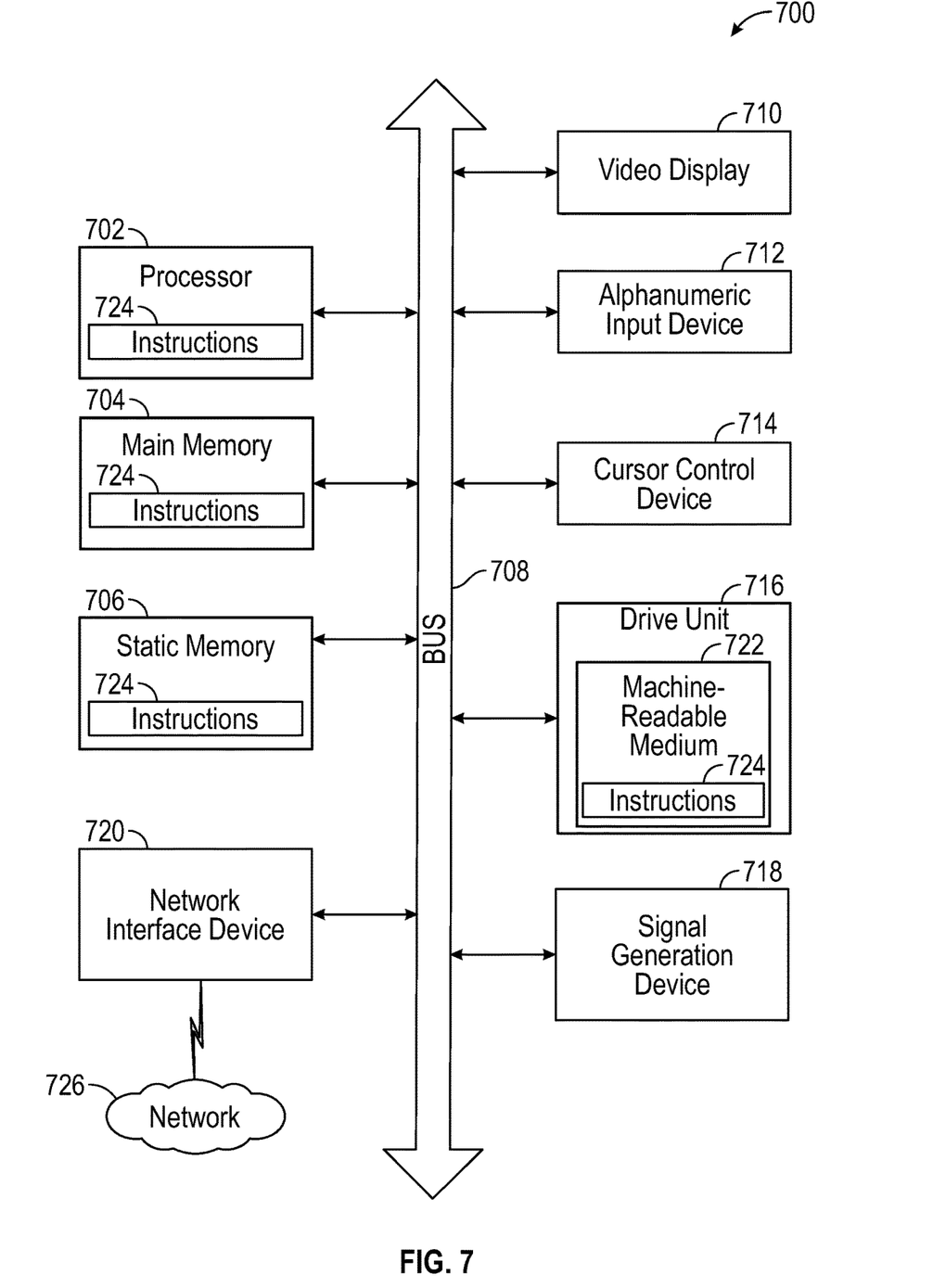
FIG. 7 illustrates a device that can be used to implement exemplary examples of the present disclosure.

FIG. 6 is a block diagram 600 illustrating a software architecture 602, which may be installed on any one or more of the devices described above. FIG. 6 is a non-limiting example of a software architecture, and it will be appreciated that other architectures may be implemented to facilitate the functionality described herein. The software architecture 602 may be implemented by hardware such as a machine 700 of FIG. 6 that includes a processor 702, memory 704 and 706, and I/O components 710-614. In this example, the software architecture 602 may be conceptualized as a stack of layers where each layer may provide a particular functionality. For example, the software architecture 602 may comprise layers including one or more of an operating system 604, libraries 606, frameworks 608, and applications 610. Operationally, the applications 610 invoke application programming interface (API) calls 612 through the software stack and receive messages 614 in response to the API calls 612, according to some implementations.

In various implementations, the operating system 604 manages hardware resources and provides common services. The operating system 604 may include, for example, a kernel 620, services 622, and drivers 624. The kernel 620 acts as an abstraction layer between the hardware and the other software layers in some implementations. For example, the kernel 620 provides memory management, processor management (e.g., scheduling), component management, networking, and security settings, among other functionality. The services 622 may provide other common services for the other software layers. The drivers 624 may be responsible for controlling or interfacing with the underlying hardware. For instance, the drivers 624 may include display drivers, camera drivers, Bluetooth R drivers, flash memory drivers, serial communication drivers (e.g., Universal Serial Bus (USB) drivers), Wi-Fi® drivers, audio drivers, power management drivers, and so forth.

In some implementations, the libraries 606 provide a low-level common infrastructure that may be utilized by the applications 610. The libraries 606 may include system libraries 630 (e.g., C standard library) that may provide functions such as memory allocation functions, string manipulation functions, mathematic functions, and the like. In addition, the libraries 606 may include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 may also include a wide variety of other libraries 634 to provide many other APIs to the applications 610.

The frameworks 608 provide a high-level common infrastructure that may be utilized by the applications 610, according to some implementations. For example, the frameworks 608 provide various graphic user interface (GUI) functions, high-level resource management, high-level location services, and so forth. The frameworks 608 may provide a broad spectrum of other APIs that may be utilized by the applications 610, some of which may be specific to a particular operating system or platform.

In an example, the applications 610 could comprise any number of suitable applications 650-668. According to some examples, the applications 610 are programs that execute functions. Various programming languages may be employed to create one or more of the applications 610, structured in a variety of manners, such as object-orientated programming languages (e.g., Objective-C, Java, or C++) or procedural programming languages (e.g., C or assembly language). In a specific example, the third-party application 668 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 668 may invoke the API calls 612 provided by the mobile operating system (e.g., the operating system 604) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors, such as processor 702, or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 206 (e.g., the Internet) and via one or more appropriate interfaces (e.g., application program interfaces (APIs), such as using the API call 612.)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

FIG. 7 is a block diagram of a machine, such as a capture device, within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706 which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device (cursor control device) 714 (e.g., a mouse), a disk drive unit 716, a signal generation device 718 (e.g., a speaker) and a network interface device 720.

The drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. Instructions 724 may also reside within the static memory 706.

While the machine-readable medium 722 is shown in an example to be a single medium, the term "machine-readable medium" may include a single medium or multiple media (e.g., a centralized or distributed database, and/or associated caches and servers) that store the one or more instructions or data instructions 724. The term "machine-readable medium" shall also be taken to include any tangible medium that is capable of storing, encoding or carrying instructions 724 for execution by the machine and that cause the machine to perform any one or more of the methodologies of the present invention, or that is capable of storing, encoding or carrying data structures utilized by or associated with such instructions 724. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTPS). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 724 for execution by the machine, and includes digital or analog communications signals or other intangible media to facilitate communication of such software.

Changes and modifications may be made to the disclosed embodiments without departing from the scope of the present disclosure. These and other changes or modifications are intended to be included within the scope of the present disclosure, as expressed in the following claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method for changing encryption keys comprising:
   encrypting a first biometric template of a first user with a first encryption key to create a first encrypted first biometric template;
   applying a transformation to the first encrypted first biometric template to create a second encrypted first biometric template;
   generating a second encryption key based on the first encryption key and the applied transformation, wherein encrypting the first biometric template with the second encryption key produces a same result as applying the transformation to a result of applying the first encryption key to the first biometric template;
   receiving from the first user an access request to a controlled space;
   capturing a biometric of the first user to create a second biometric template;
   encrypting the second biometric template with the second encryption key to produce an encrypted second biometric template;
   comparing the encrypted second biometric template with the second encrypted first biometric template; and granting the access request to the controlled space if a match of the comparing occurs and denying the access request otherwise.

2. The method of claim 1, further comprising:
storing the first encrypted first biometric template at a database; and
determining that the database has been compromised, wherein the transformation is applied to the first encrypted first biometric template in response to determining that the database has been compromised.

3. The method of claim 1, wherein the first biometric template is a metadata file corresponding to a biometric obtained with a biometric sensor.

4. The method of claim 3, wherein an artificial neural network (ANN) is used to create features for the first biometric template and the ANN is a convolutional neural network.

5. The method of claim 3, wherein the biometric sensor is one of a fingerprint scanner, a facial recognition terminal, an iris scanner, a retinal scanner, a palm scanner, or a palm vein scanner, and the biometric corresponds to data from the biometric sensor.

6. The method of claim 1, wherein the transformation is created as a function of the first encryption key and the second encryption key.

7. The method of claim 1, wherein the second encryption key is equivalent to a concatenation of the first encryption key and the transformation.

8. A system for changing encryption keys comprising:
a processor; and
memory including instructions that, when executed by the processor, cause the system to perform operations including:
encrypting a first biometric template of a first user with a first encryption key to create a first encrypted first biometric template;
applying a transformation to the first encrypted first biometric template to create a second encrypted first biometric template;
generating a second encryption key based on the first encryption key and the applied transformation, wherein encrypting the first biometric template with the second encryption key produces a same result as applying the transformation to a result of applying the first encryption key to the first biometric template;
receiving from the first user an access request to a controlled space;
capturing a biometric of the first user to create a second biometric template;
encrypting the second biometric template with the second encryption key to produce an encrypted second biometric template;
comparing the encrypted second biometric template with the second encrypted first biometric template; and
granting the access request to the controlled space if a match of the comparing occurs and denying the access request otherwise.

9. The system of claim 8, the instructions further causing the system to perform operations comprising:
storing the first encrypted first biometric template at a database; and
determining that the database has been compromised, wherein the transformation is applied to the first encrypted first biometric template in response to determining that the database has been compromised.

10. The system of claim 8, wherein the first biometric template is a metadata file corresponding to a biometric obtained with a biometric sensor, an artificial neural network (ANN) is used to create features for first biometric template and the ANN is a convolutional neural network.

11. The system of claim 8, wherein the first biometric template is a metadata file corresponding to a biometric obtained with a biometric sensor and the biometric sensor is one of a fingerprint scanner, a facial recognition terminal, an iris scanner, a retinal scanner, a palm scanner, or a palm vein scanner, and a biometric corresponds to data from the biometric sensor.

12. The system of claim 8, wherein the transformation is created as a function of the first encryption key and the second encryption key.

13. The system of claim 8, wherein the second encryption key is equivalent to a concatenation of the first encryption key and the transformation.

14. A non-transitory computer-readable storage medium comprising non-transitory computer-readable instructions that, when executed by one or more processors, configure the one or more processors to perform operations for changing encryption keys comprising:
encrypting a first set of biometric templates of a first user with a first encryption key to create a first set of encrypted first biometric templates;
applying a transformation to the first set of encrypted first biometric templates to create a second set of encrypted first biometric templates;
generating a second encryption key based on the first encryption key and the applied transformation, wherein encrypting the first set of biometric templates with the second encryption key produces a same result as applying the transformation to a result of applying the first encryption key to the first set of biometric templates;
receiving from the first user an access request to a controlled space;
capturing a biometric of the first user to create a second biometric template;
encrypting the second biometric template with the second encryption key to produce an encrypted second biometric template:
comparing the encrypted second biometric template with the first set of encrypted first biometric templates; and
granting the access request to the controlled space if a match of the comparing occurs and denying the access request otherwise.

15. The non-transitory computer-readable storage medium of claim 14, the operations further comprising:
storing the first set of encrypted biometric templates in a database; and
determining a subset of the first set of encrypted biometric templates has been compromised, wherein the transformation is applied to a corresponding subset of encrypted first biometric templates in response to determining that the database has been compromised.

16. The non-transitory computer-readable storage medium of claim 14, wherein one or more of the first set of biometric templates is a metadata file corresponding to the biometric obtained with a biometric sensor and an artificial neural network (ANN) is used for image processing to create features for the one or more of the first set of biometric templates and the ANN is a convolutional neural network.

17. The non-transitory computer-readable storage medium of claim 14, wherein the transformation is created as a function of the first encryption key and the second encryption key.

* * * * *